United States Patent
Turner

(10) Patent No.: US 6,453,635 B1
(45) Date of Patent: *Sep. 24, 2002

(54) COMPOSITE UTILITY POLES AND METHODS OF MANUFACTURE

(75) Inventor: Daryl Turner, Phoenix, AZ (US)

(73) Assignee: Powertrusion International, Inc., Scottsdale, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 09/580,652

(22) Filed: May 23, 2000

Related U.S. Application Data

(63) Continuation-in-part of application No. 09/116,096, filed on Jul. 15, 1998, now Pat. No. 6,155,017.

(51) Int. Cl.[7] .................................................. E04C 3/30
(52) U.S. Cl. .................... 52/726.4; 52/726.2; 52/731.4; 52/736.1; 52/737.1; 403/359.6
(58) Field of Search .................... 52/309.1, 309.9, 52/726.4, 731.1, 733.1, 736.1, 736.2, 736.3, 736.4, 738.1, 726.2, 726.3, 731.4, 737.1; 403/109, 369, 371, 374, 377, 359.1, 359.4, 359.6

(56) References Cited

U.S. PATENT DOCUMENTS

| 213,715 A | 3/1879 | Von Mengden |
|---|---|---|
| 224,775 A | 2/1880 | Fryer, Jr. |
| 666,146 A | 1/1901 | Lanz |
| 1,445,938 A | 2/1923 | Farrington |
| 2,109,508 A | 3/1938 | Schmittutz |
| 2,870,793 A | 1/1959 | Bailey |
| 3,177,667 A | 4/1965 | Liddell |
| 3,270,480 A | 9/1966 | Beecker |
| 3,378,978 A | 4/1968 | Durand |
| 3,570,376 A | 3/1971 | Overton, III et al. |

(List continued on next page.)

FOREIGN PATENT DOCUMENTS

| CA | 774805 | 1/1968 |
|---|---|---|
| DE | 24 36 547 | 4/1976 |
| WO | WO 00/04251 | 1/2000 |

OTHER PUBLICATIONS

Composite Power Corporation, "Energy Deliver System Engineered for the Environment", 4 pages.

"Power Pole Stands Tall", Composites Technology, Nov./Dec. 1999, pp. 29–32.

*Primary Examiner*—Carl D. Friedman
*Assistant Examiner*—Yvonne M. Horton
(74) *Attorney, Agent, or Firm*—Blakely, Sokoloff, Taylor & Zafman LLP

(57) ABSTRACT

Composite utility pole structures and methods of manufacture using a pultrusion process. The poles may be N sided, with longitudinal pre-stressed rovings in each corner. The inner periphery of the poles may have flat regions centered between the outside corners, with the flat regions joined by circular arcs in the corner regions. Various pole structures and methods of manufacture are described, including curved poles and poles having walls that are tapered in thickness and structure.

89 Claims, 9 Drawing Sheets

U.S. PATENT DOCUMENTS

| | | |
|---|---|---|
| 3,574,104 A | 4/1971 | Medler |
| 3,726,360 A | 4/1973 | Price et al. |
| 3,813,098 A | 5/1974 | Fischer et al. |
| 3,813,837 A | 6/1974 | McClain et al. |
| 3,970,401 A | 7/1976 | Lubeck |
| 4,142,343 A | 3/1979 | Trafton |
| 4,144,111 A | 3/1979 | Schaerer |
| 4,155,970 A | 5/1979 | Cassell |
| 4,194,338 A | 3/1980 | Trafton |
| 4,202,520 A | 5/1980 | Loos et al. |
| 4,211,692 A | 7/1980 | Barkis et al. |
| 4,312,162 A | 1/1982 | Medney |
| 4,347,090 A | 8/1982 | Anderson et al. |
| 4,458,455 A | 7/1984 | Tollstoff de Voss |
| 4,488,844 A | 12/1984 | Baubles |
| 4,583,359 A | 4/1986 | Staeger |
| 4,702,057 A | 10/1987 | Phillips |
| 4,738,058 A | 4/1988 | Svensson |
| 4,751,804 A | 6/1988 | Cazaly |
| 4,769,967 A | 9/1988 | Bourrieres |
| 4,803,819 A | 2/1989 | Kelsey |
| 4,846,908 A | 7/1989 | Aldrich et al. |
| 4,907,624 A | 3/1990 | Jonasson |
| 4,918,883 A | 4/1990 | Owen et al. |
| 4,939,002 A | 7/1990 | Hilakos |
| 5,175,971 A | 1/1993 | McCombs |
| 5,176,775 A | 1/1993 | Montsinger |
| 5,218,375 A | 6/1993 | Hillman |
| 5,218,810 A | 6/1993 | Isley, Jr. |
| 5,222,344 A | 6/1993 | Johnson |
| 5,228,251 A | 7/1993 | Frigon |
| 5,250,132 A | 10/1993 | Lapp et al. |
| 5,324,377 A | 6/1994 | Davies |
| 5,329,744 A | 7/1994 | Sumter |
| 5,339,594 A | 8/1994 | Ventura-Berti |
| 5,374,385 A | 12/1994 | Binse et al. |
| 5,379,566 A | 1/1995 | Schworer |
| 5,447,793 A | 9/1995 | Montsinger |
| 5,513,477 A | 5/1996 | Farber |
| 5,540,017 A | 7/1996 | Eilam et al. |
| 5,540,870 A | 7/1996 | Quigley |
| 5,546,707 A | 8/1996 | Caruso |
| 5,549,947 A | 8/1996 | Quigley et al. |
| 5,555,696 A | 9/1996 | Morrison, III et al. |
| 5,725,954 A | 3/1998 | Montsinger |
| 5,809,734 A * | 9/1998 | Turner ................... 52/736.1 |
| 5,870,877 A * | 2/1999 | Turner ................... 52/736.3 |
| 6,155,017 A * | 12/2000 | Turner ................... 52/726.4 |

* cited by examiner

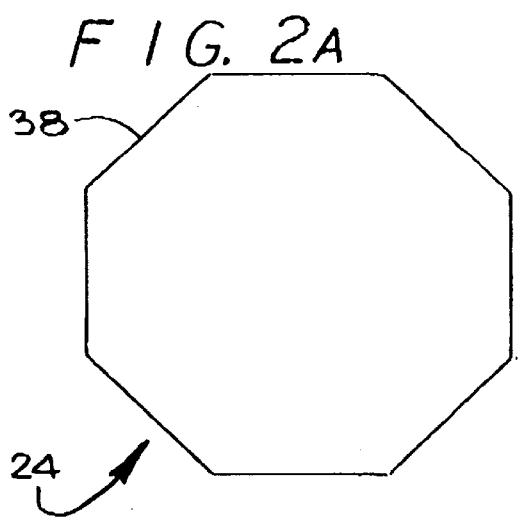
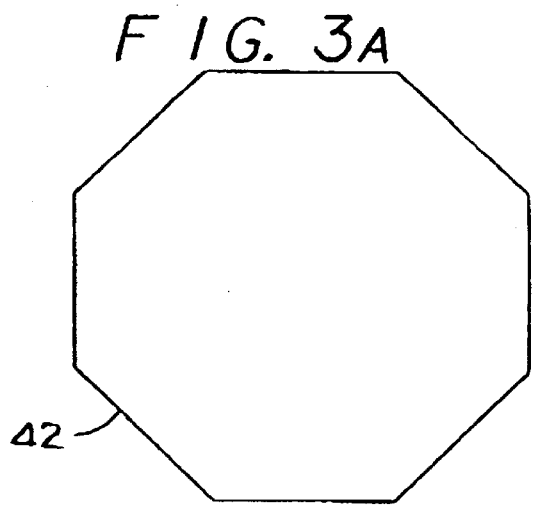
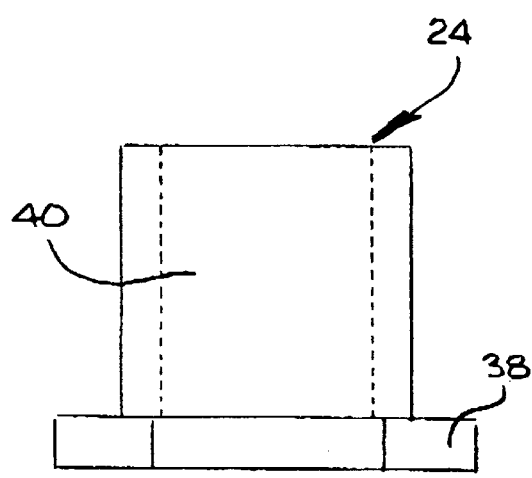
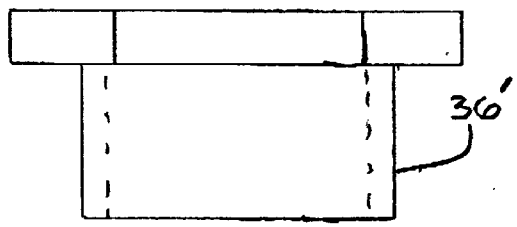
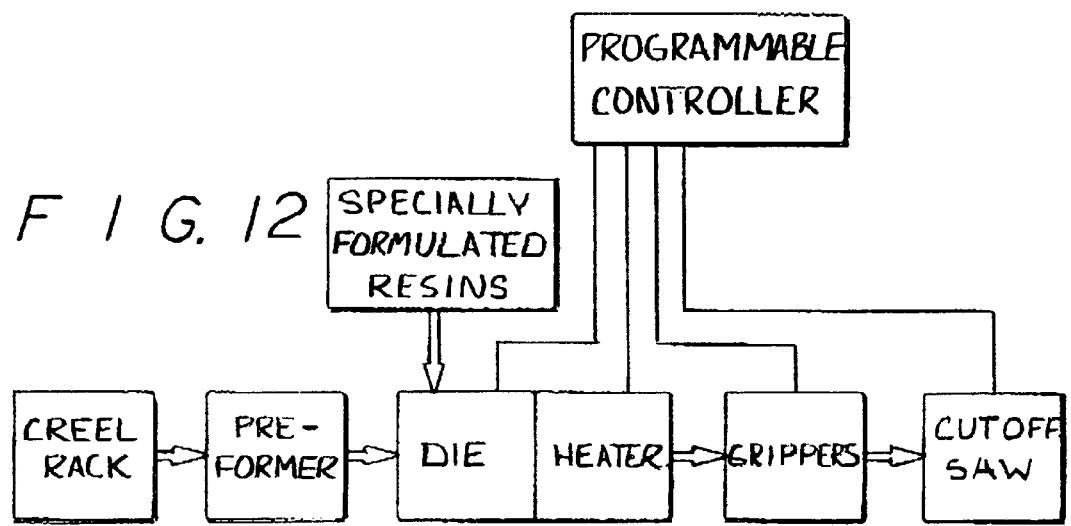

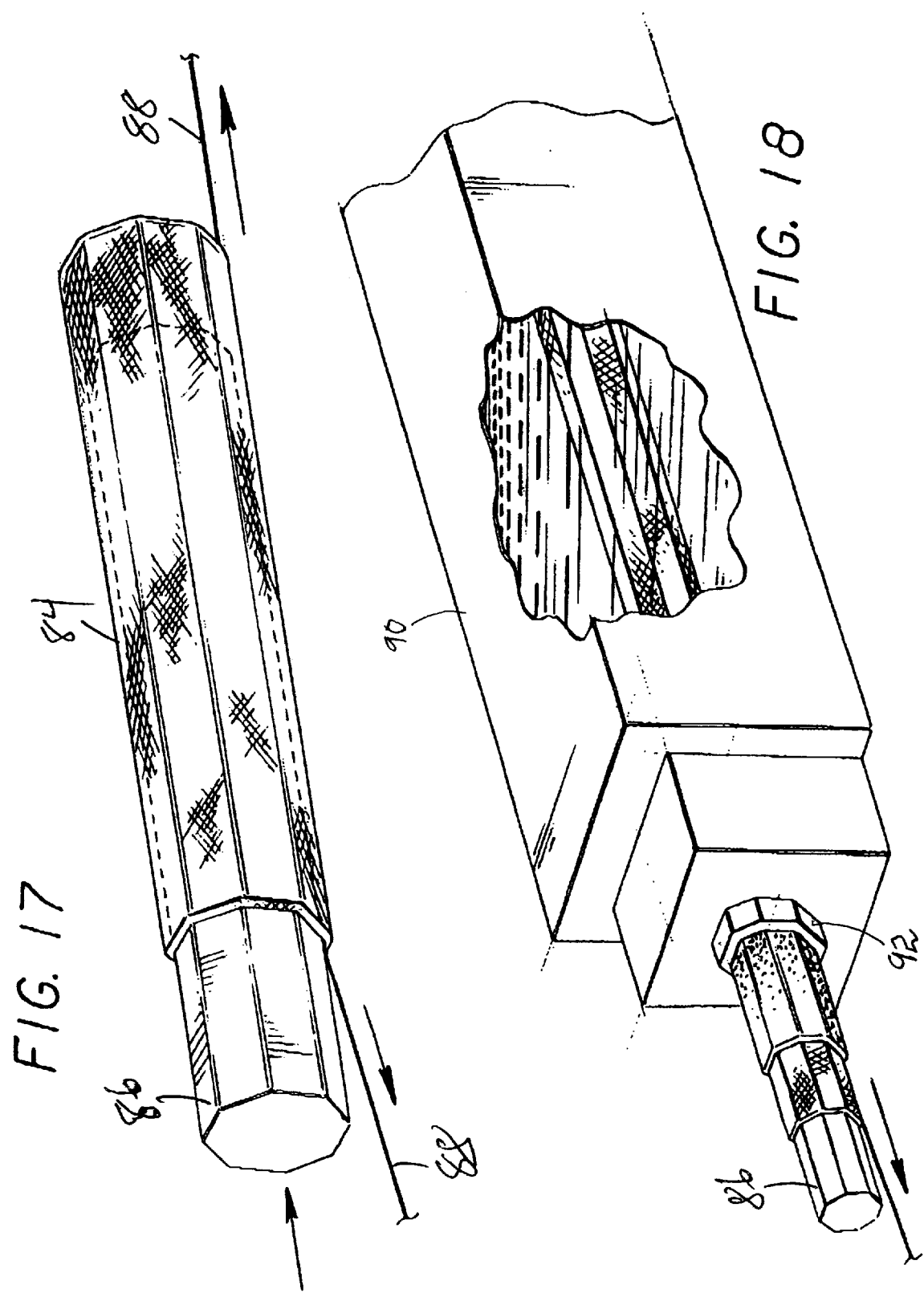

COMPOSITE UTILITY POLES AND METHODS OF MANUFACTURE

CROSS-REFERENCE TO RELATED APPLICATIONS

This is a continuation-in-part application of application Ser. No. 09/116,096 filed Jul. 15, 1998 now U.S. Pat. No. 6,155,017.

BACKGROUND OF THE INVENTION

1. Field of the Invention

The present invention relates to utility pole structures constructed of composite materials.

2. Description of Related Art

Utility poles are typically constructed from wooden poles that are anchored into the ground. The utility poles will typically have arms that support a number of electrical power lines. The continuous exposure to harsh environmental conditions can cause the wood poles to rot and decay. To prevent rotting, the wood is sometimes treated with a carbon base material such as tar. It has been found that most conventional wood treating material is harmful to the environment. Additionally, it has been found that a significant amount of electrical current drains to the ground, thereby reducing the energy efficiency of the power system.

Metal poles have been installed to increase the life of the utility poles. Metal poles are highly conductive and generally create an unsafe environment for the utility personnel that maintain and repair the pole. Additionally, both metal and wooden poles are relatively heavy, typically requiring a crane to lift and install the poles.

U.S. Pat. No. 5,175,971 issued to McCombs discloses a hollow utility pole that is constructed from a composite material such as a resin impregnated fiberglass. The McCombs pole has a hexagonally shaped liner located within a hexagonally shaped primary pole. The outer primary pole has a plurality of dove tail grooves that allow arm attachments to be mounted to the pole. Additionally, the grooves allow personnel to climb the pole. The dove tail grooves create a number of rounded fingers located adjacent to thin neck portions of the primary pole.

It has been found that when forming the composite, the resin and glass fibers do not evenly flow into the neck and finger portions of the primary pole. The uneven resin flow and glass fiber distribution can reduce the structural integrity of the pole. The rounded finger portions also add thickness and weight to a utility pole that can be 40 feet in length.

The hollow McComb utility pole has relatively low bending and torsional stiffnesses. The relatively low stiffness must be compensated for by a thicker wall. Increasing the thickness of the wall increases the weight of the pole. It would be desirable to provide a relatively strong, lightweight utility pole which can be efficiently constructed from a composite material.

SUMMARY OF THE INVENTION

Composite utility pole structures and methods of manufacture using a pultrusion process. The poles may be N sided, with longitudinal pre-stressed rovings in each corner. The inner periphery of the poles may have flat regions centered between the outside corners, with the flat regions joined by circular arcs in the corner regions. Various pole structures and methods of manufacture are described, including curved poles and poles having walls that are tapered in thickness and structure.

BRIEF DESCRIPTION OF THE DRAWINGS

The objects and advantages of the present invention will become more readily apparent to those ordinarily skilled in the art after reviewing the following detailed description and accompanying drawings, wherein:

FIGS. 2a and 2b are cross-sectional views of a base for a telephone pole of the type of FIG. 1.

FIGS. 3a and 3b are cross-sectional views of a cap for a telephone pole of the type of FIG. 1.

FIG. 12 is a block diagram for the control system for the pultrusion machine of FIG. 11.

FIGS. 17 and 18 illustrate preferred methods for constructing a utility pole with a pultrusion process.

DETAILED DESCRIPTION OF THE INVENTION

Figure 1:
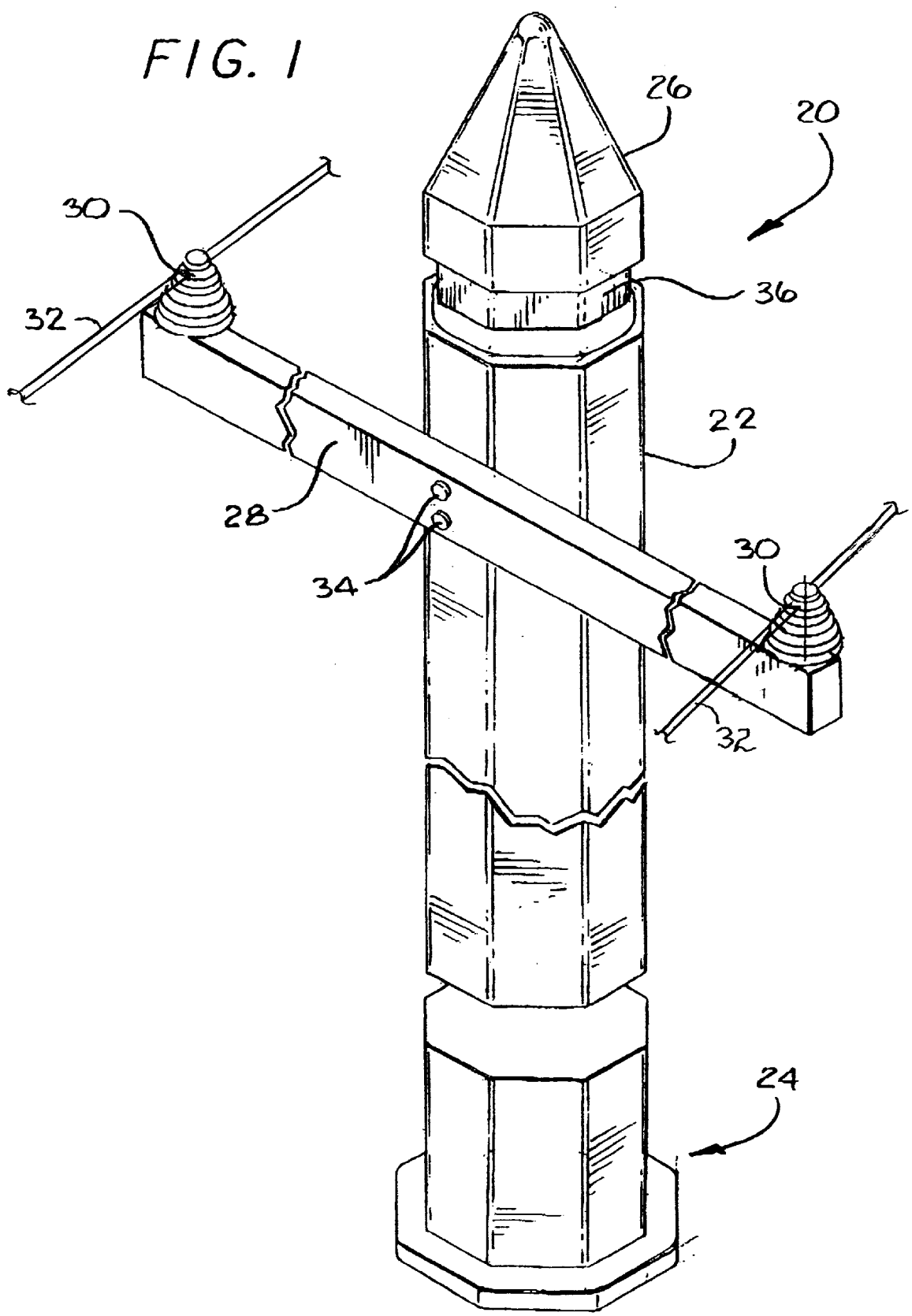
FIG. 1 is a perspective view of an exemplary telephone pole of the present invention.

Referring to the drawings more particularly by reference numbers, FIG. 1 shows a utility pole assembly 20 of the present invention. The components of the pole assembly 20 are constructed from a composite material such as a fiberglass reinforced resin. The outer surface of the composite material is typically smooth so that animals do not climb the pole. Such a utility pole will not carry bacteria or generate slivers that can be dangerous to maintenance and repair personnel. The composite material is also a dielectric, which significantly reduces the amount of current that drains to the ground, thereby increasing the energy efficiency of the power system. The composite pole assembly is generally immune to corrosive ambient conditions and is not susceptible to being struck by lightening. The composite material may be wrapped with a cloth that contains ultraviolet resistant additives or coated with ultraviolet resistant coatings which provide protection from solar energy.

The pole assembly 20 illustrated in FIG. 1 includes a main pole member 22, a base member 24, and a top cap 26. Also shown is an exemplary cross arm 28 with insulators 30 supporting power lines 32. In the embodiment shown, the cross arm 28 is bolted to the pole 22 by through bolts 34 extending through holes in the cross arm 28 and in opposite walls of the pole 22.

The top cap 26 shown in exploded form in FIG. 1 has a downward protruding skirt 36 having an outer periphery generally matching the inner periphery of the pole 22. The specific cap shown has a relatively pointed top to discourage birds, particularly larger birds, from perching thereon. The cap 26 typically will be a hollow filament reinforced resin member such as a fiberglass reinforced resin, which may be bonded in position on the cylindrical pole 22, though more preferably will be retained in position by screws extending through the upper wall of the cylindrical pole 22 into the skirt 36 on the cap.

The base 24 is similar in general construction as the cap 26, being shown in FIGS. 3a and 3b. The base 24 includes a flange 38 which is larger then the outer periphery of the pole 22, providing a flange through which the pole may be supported and leveled on concrete encased threaded studs passing through holes (not shown) in the base 22 and trapped in position between washers and nuts on the thread studs. Alternatively, other methods of mounting the pole, including burying in the ground, encasing in concrete and the like may readily be used if desired.

The base itself includes an upward projecting skirt 40 also fitting within the cylindrical pole 22, though generally protruding much further into the pole than the cap 26 (FIG. 1) to provide a more rigid junction between the base 24 and the pole 22. Like the cap 26, the base 24 is preferably a filament reinforced resin such as a fiberglass reinforced resin member. The skirt 40 on the base 24 is hollow, like the skirt 36 on cap 26 (FIG. 1), though the skirt 40 as shown on FIG. 2b will be substantially thicker than the skirt on the cap to provide adequate resistance to the bending stresses thereon due to the tension on the wires 32 (FIG. 1), windage and other forces temporarily or permanently on the pole.

The pole 22 may be joined to the base 24 by various techniques, such as by screws or through bolting, particularly if the pole end is to be buried for anchoring, though resin bonding may be preferred to distribute the load over the relatively large surface area of the skirt 40 in a manner free of any possible movement or looseness in the connection. In that regard, if desired, the top of the skirt 40 of the base 24 may have an inner periphery which tapers outward to the outer periphery of the skirt adjacent the top thereof so as to avoid a step change in the effective wall thickness from the lower region of the pole, wherein the effective thickness will be equal to the pole thickness plus the skirt thickness, to the pole thickness only, just above the top of the skirt. Alternatively, the base, the top cap or both may be configured to fit over the outer periphery of the pole.

Of course the base and/or top cap may be of other configurations as desired. By way of example, an alternative top cap is shown in FIGS. 3a and 3b. Here the top cap has an upper flange 42 generally conforming in periphery to the periphery of the pole 22, with a downward projecting skirt 36' substantially the same as that described with respect to skirt 36 illustrated in FIG. 1. The alternate cap shown in FIGS. 3a and 3b has the advantage of being physically smaller than cap 26 of FIG. 1 and thus less expensive, more easily stored and shipped, etc, though has the disadvantage of providing a convenient perch for birds, particularly large birds which can be subject to fatal shock hazards because of their wing span.

Figure 4:
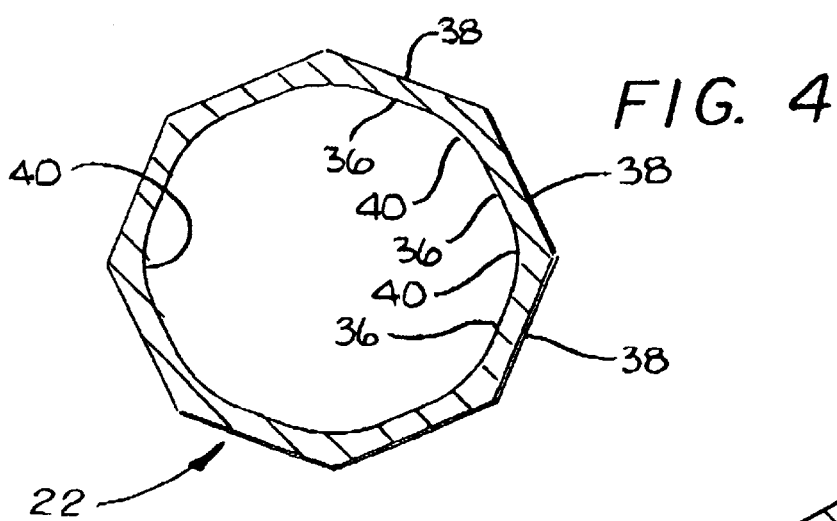
FIGS. 4, 5 and 6 are cross-sectional views of poles illustrating poles of various number of sides.
Figure 5:
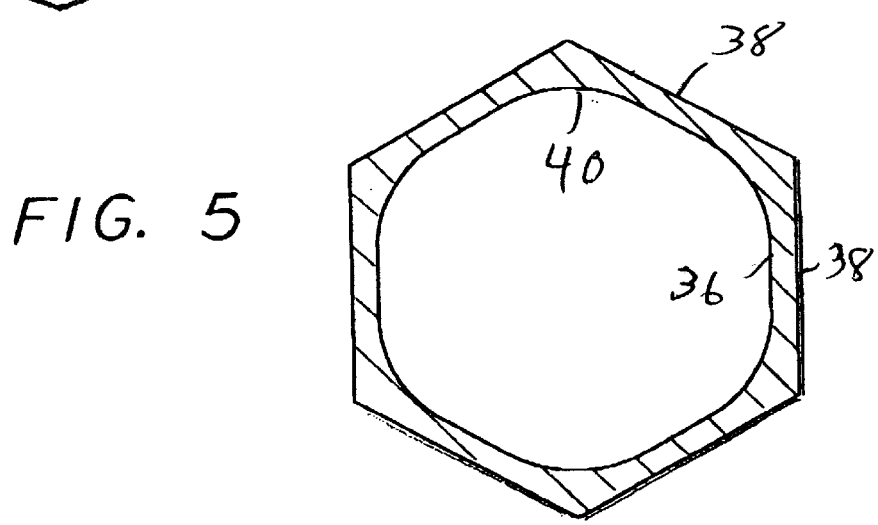
Figure 6:
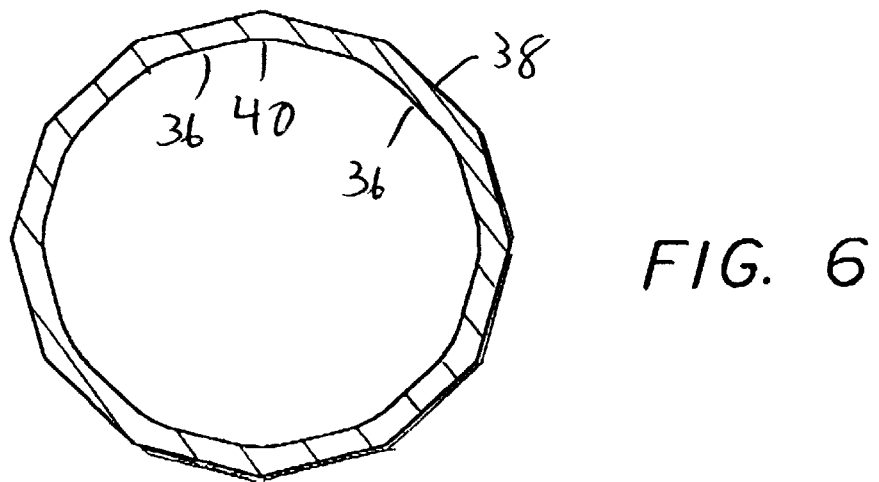
Figure 7:
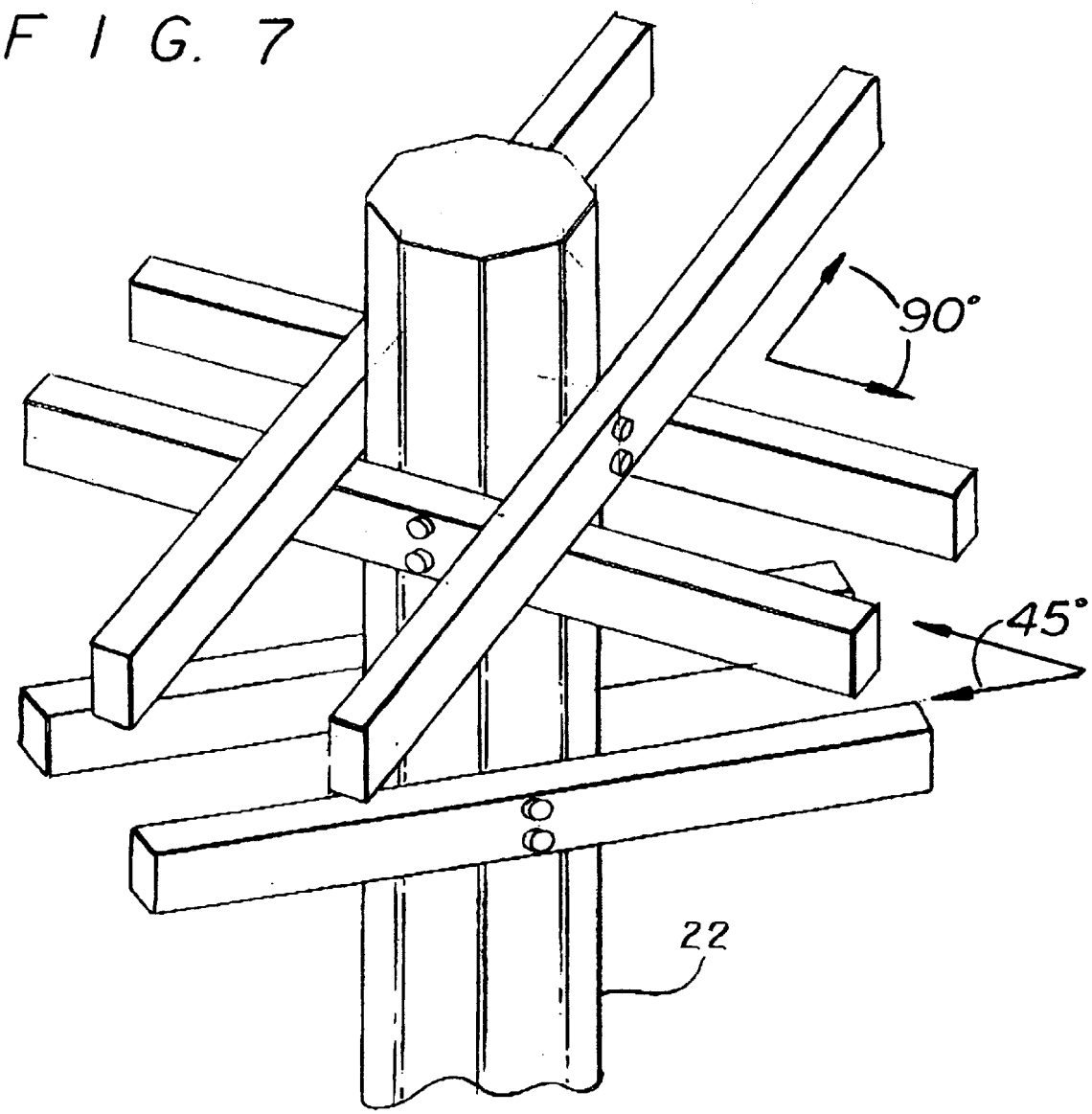
FIG. 7 is a perspective view illustrating some of the various mounting possibilities for cross arms.

Now referring to FIG. 4, a cross section of the pole 22 of FIG. 1 may be seen. The preferred cross section as shown in FIG. 4 is characterized by various geometric shapes. The outer periphery of the pole is octagonal, that is, the pole has eight substantially flat exterior surfaces, any of which may be used for the mounting of cross arms as is illustrated in FIG. 7. The eight sides of the external surface of the pole is a convenient number of sides, as it allows mounting of the cross arms in a manner orthogonal to each other as well as at 45° degrees, adequately accommodating substantially any requirements normally found in practice. The eight sides also provides structural advantages, as shall be subsequently described, though a lesser or greater number of sides for the outer periphery of the pole may also be used if desired. By way of example, FIG. 5 illustrates a 6 sided pole, while FIG. 6 illustrates a 12 sided pole, both of which may also be fabricated in accordance with the present invention. Poles of lesser or greater numbers of sides may be fabricated in accordance with the present invention, though poles with not less than 6 sides or no more than 12 sides are preferred, with 8 sides poles being most preferable for fabrication, structural and other reasons.

The internal periphery of the pole 22 as shown in FIG. 4 is preferably defined by a plurality of flat regions 36 parallel to the flat sides 38 on the outer periphery of the pole, with the flat sides 36 being joined by circular arcs 40 tangent to adjacent flat regions 36. This is referred to as a circular-tangere shaped inner channel. Providing an inner channel 36/40 that is circular-tangere in shape eliminates stress concentrators found in non-circular shaped inner channels of the prior art. Providing a polygonal shaped Outer surface minimizes the weight and material cost of the utility beam 22 without significantly reducing the structural integrity of the beam 22. Thus this configuration is preferred because of the structural advantages of the finished pole, helping to reduce the amount of material required to obtain the desired strength and other physical properties of the pole. As may be seen in FIGS. 5 and 6, the flat regions joined by circular arcs to define the internal periphery of a pole is applicable not only to the eight sided pole illustrated in FIG. 4, but it is also applicable to poles of other numbers of sides, such as the six-sided pole of FIG. 5 and the twelve-sided pole of FIG. 6.

Figure 8:
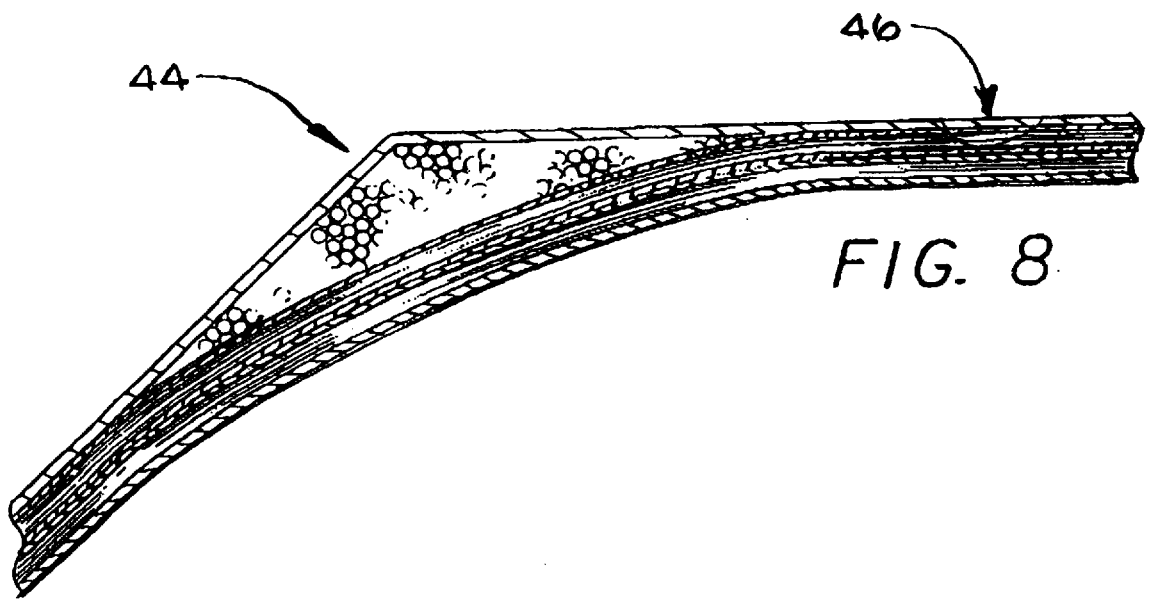
FIG. 8 is a cross-sectional view of the pole of FIGS. 1 and 4 takes in the region of a corner thereof.

Now referring to FIG. 8, a cross section through one of the corners of the pole 22 of FIG. 1 may be seen. While this cross section is representative of the preferred cross section of an eight-sided pole, it is exemplary of a preferred cross section through a corner of poles of other numbers of sides. The cross section of a pole has two characteristic regions, namely the region of the cross section taken through a corner itself, generally indicated by the numeral 44 in FIG. 8, and a cross section taken through a substantially uniform thickness region between corner areas generally indicated by the numeral 46. The region 46 of course is bounded on the inner surface of the pole by one of the flat regions 36 illustrated in FIG. 4. While the cross section of FIG. 8 illustrates all of the various layers in these two regions, the clarity through the various layers in the cross section is less than ideal because of the scale of the cross section. Accordingly, the layers making up region 44 in the preferred embodiment are better illustrated in the exploded view of FIG. 9, and the layers making up region 46 are better illustrated in the exploded view of FIG. 10.

Figure 10:
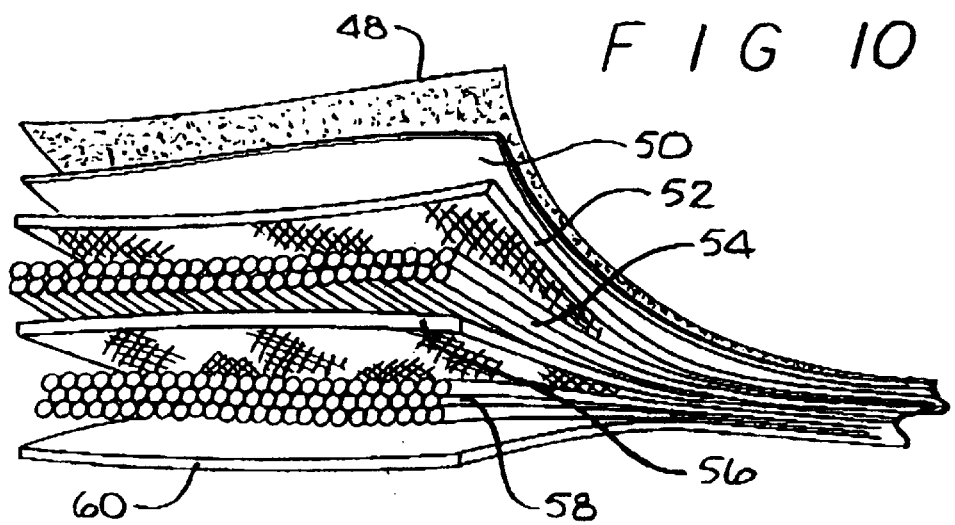
FIG. 10 is an exploded cross-sectional view of a pole taken through region 46 of FIG. 8.

Referring first to FIG. 10, various layers making up region 46 from the outside surface of the pole to the inside surface of the pole include an ultraviolet resistant layer 48, a veil 50, a layer of woven fabric 52, a layer of substantially longitudinal rovings 54, a further woven fabric layer 56, a further layer of substantially longitudinal rovings 58, and finally an inner layer 60 typically in the form of a non-woven mat. (As used herein, the word rovings includes twisted or straight rovings.) The ultraviolet resistant layer 48 is generally applied after the pole is formed. The veil 50 and mat 60 are generally selected to provide limited friction during the pole formation process, referred to as a pultrusion process herein and subsequently further described. Accordingly, these layers may be comprised of a polyester, rayon, nylon, carbon or other fiber structure, selected more for its low friction characteristics than its strength, as these layers are preferably relatively thin. The layers comprising the rovings and the woven fabrics are generally structural, and accordingly preferably are fiberglass, Kevlar, or other suitable high strength filament materials.

Figure 9:
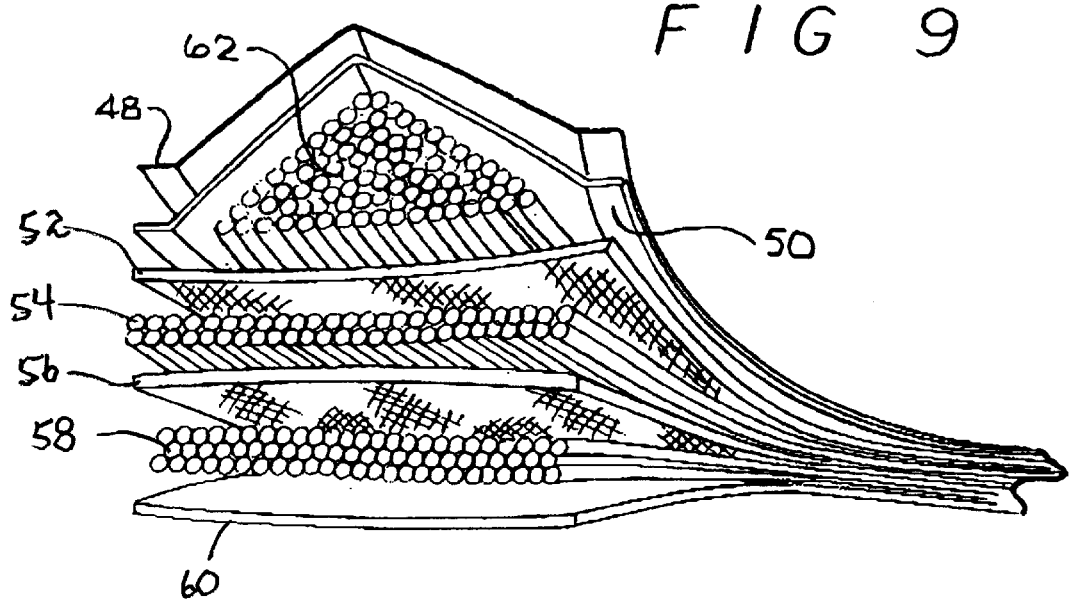
FIG. 9 is an exploded cross-sectional view of a pole taken through region 44 of FIG. 8.

The cross section through region 44 as illustrated in FIG. 9 is similar to the cross section through region 46 (FIG. 8) as illustrated in FIG. 10, though with the addition of a generally triangular shaped bundle of rovings 62 filling the corner regions of the pole. As shall subsequently be seen, the various layers other than layer 48 are soaked in : resin, with the resin being cured in the pultrusion process while the rovings 54, 58 and 62 are under a predetermined tension to provide pre-stressed rovings in the finished pole. The number of layers of mats 52 and rovings 56 may be increased as the pole 22 increases in diameter and height or decrease for smaller diameters resulting in a thicker or thinner wall of the pole.

Figure 11:
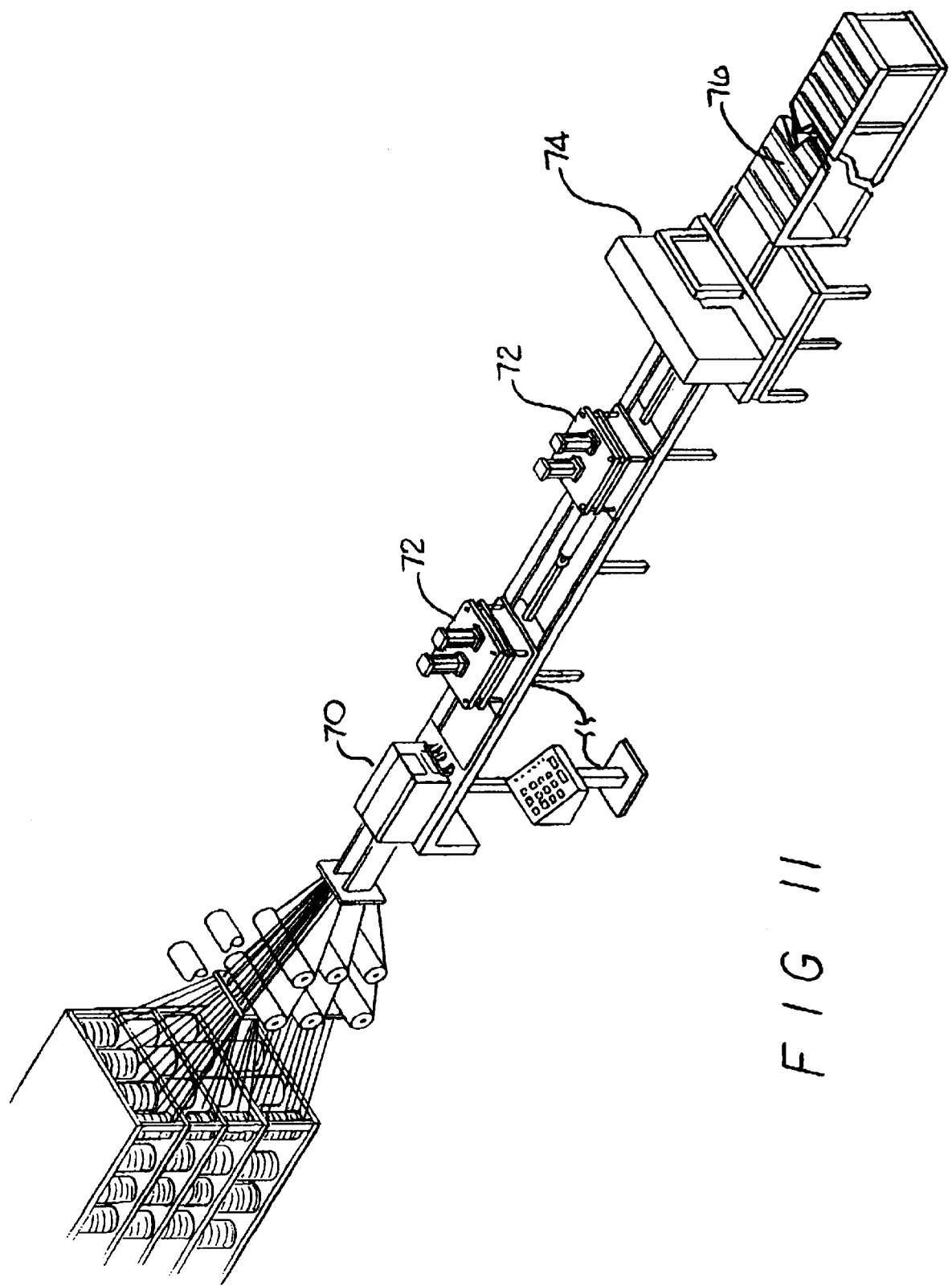
FIG. 11 is a perspective view of a pultrusion machine for pultruding the poles of the present invention.

Now referring to FIG. 11, a perspective view of the apparatus for fabricating the poles of the present invention may be seen. The apparatus is perhaps most easily described with respect to the function of the various parts of the machine contributing to the formation of a finished pole. In particular, at the left end of the machine are a relatively large number of creels holding the rovings and the various woven and unwoven mats used in the fabrication of a pole. In the preferred embodiment, 500 roving creels and 12 mat creels are provided. The rovings and mats are guided by various rollers and other guides to an impregnation and heated die station 70, where the rovings and mats are saturated with the appropriate resin, which may be by way of example, an isopthahalic polyester, and pulled through the heated die to squeeze out excess resin and cure the resin impregnating the rovings and mats to form the pole. A pair of reciprocating gripper assemblies 72 provide continuous movement of the various materials through the impregnation region and heated die 70 to effectively pultrude the pole in a continuous process. As part of the roving supplies, controllable drag forces are provided on the rovings and mats so as to particularly provide a pre-determined tension in the rovings in the cured pole. For a typical eight sided, 10 inch pole, a total tension on the rovings in the range of 18,000 to 27,000 lbs. and preferably approximately 20,000 lbs. may be used. This provides a pre-stressed load in the rovings of approximately 2,500 to 3,800 pounds per square inch, or a preferred load of 2,800 pounds per square inch. For poles of different sizes, the materials and tensions scale approximately by the square of the ratio of the dimension between parallel exterior sides, though different tensions and amounts of rovings, mats and the like may be used if desired, particularly more material to result in a thicker wall in the finished pole.

The reciprocal gripper assemblies 72 allow one gripper assembly to pull a pole through a heated die while the other gripper assembly 72 is returning for a shorter grip on the pole. Also, as part of the assembly shown in FIG. 11, a cutoff saw 74 is provided for slicing the poles to the appropriate length, the poles then being collected on the takeoff conveyer 76 for further processing and shipping. As part of the preferred process, before the pole reaches the gripper assembly 72, the ultraviolet resistant layer or layers are sprayed or squeegeed onto the hot pole, with the heat of the pole curing the ultraviolet resistant layer before the pole reaches the gripper assembly. The ultraviolet resistant layer may be a single layer or a plurality of layers such as an adhesion layer covered by the ultraviolet resistant layer itself.

The pultrusion process is controlled by a programmable controller illustrated in FIG. 12. As the Figure illustrates, the creel racks supplying the rovings and mats include preformers which position and tension the rovings and properly form and position the mats, with a programmable controller controlling the pultrusion die; the specially formulated resins provided thereto, the die heater, the gripper assemblies, and the cutoff saw.

Figure 13:
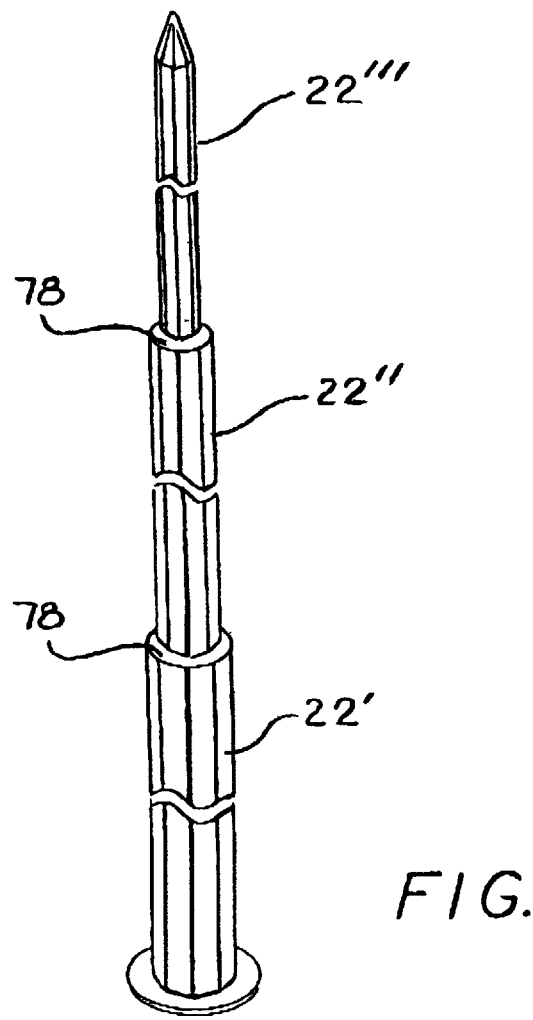
FIG. 13 is a perspective view of a tiered pole formed by joining poles of different sizes.

Now referring to FIG. 13, a particularly tall or long pole formed by the joining of three tiered sections 22', 22" and 22'" with descending cross-sectional areas may be seen. While three tiers are illustrated, fewer or additional tiers may be used. Such a pole can be constructed to be 120 feet long or more, thereby providing a single high extension utility unit. Tiering the pole reduces the weight without compromising the structural integrity of the pole. In a preferred embodiment, the outer periphery and the inner periphery of a typical pole have different geometries. Coupling members 78 are used to couple two poles of different size, and to seal the internal region of the poles from moisture penetration.

Figure 16:
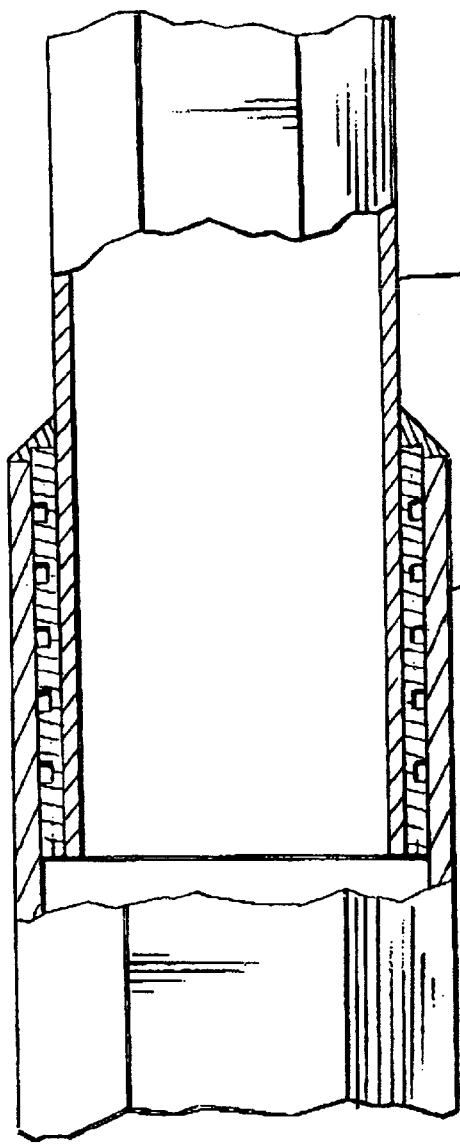
FIG. 16 is a cross-sectional view of two poles bonded together using the coupler of FIG. 14.
Figure 14:
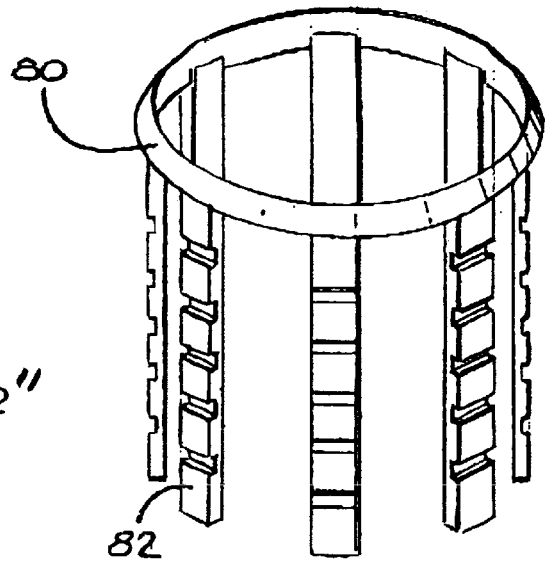
FIG. 14 is a perspective view of a coupler for coupling together the tiered poles of FIG. 13.
Figure 15:
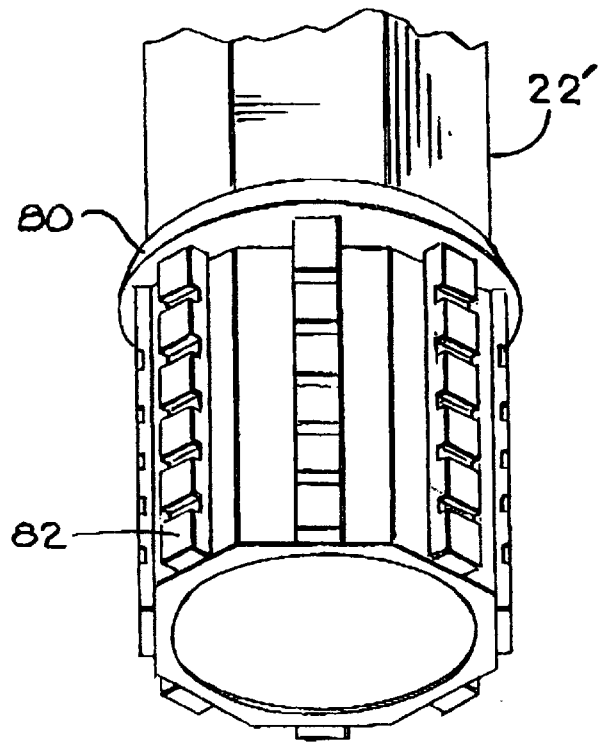
FIG. 15 is a perspective view similar to FIG. 14 showing a coupler bonded to the periphery of a smaller pole.

A preferred form of coupling member is shown in FIGS. 14, 15, and 16. As shown in FIGS. 14 and 15, the exemplary coupling members have an integral top ring 80 with a plurality of downward protruding legs 82 equal in number to the number of sides on the poles to be joined. Each of legs 82 in the preferred embodiment are slotted so as to make the same more flexible, whereby the legs may readily serve as spacers between the two poles without causing substantial stress concentration in the areas in which the poles are joined. The notches in the legs 82 provide for bending of the legs while transferring the loads so that the otherwise stiff legs do not explode through the wall of a pole. For the joining of adjacent poles such as poles 22' and 22'" (FIG. 16), the couplers may be first bonded to the smaller pole 22" and then the coupler on pole 22" bonded to a larger pole 22' as shown on FIG. 16. Alternatively, of course, the coupler may first be bonded within the larger pole and then bonded to the smaller, or bonded to both poles simultaneously. In any event, the ring 80 on the coupler provides a water barrier for the region between the two poles, with the coupler and end of the associated pole extending far enough into the larger pole so as to minimize the stresses at the junction of the two poles due to bending moments on the bonding junction.

FIGS. 17 and 18 show an alternative method for constructing a utility pole with a pultrusion process. A sock 84 is initially constructed from a woven and/or knitted fiber such as fiberglass. An inner mold or mold plug 86 is then placed into the sock 84. Each end of the sock 84 has a rope 88 that is preferably constructed from KEVLAR. The rope 88 is pulled to expand the sock 84 and place the fibers in tension. The rope 88 may be configured to uniformly tension the sock for forming straight beams, or positioned off center to unevenly tension the sock, or even to only tension one side of the sock to form curved poles.

The inner mold 86 and tensioned sock 84 are passed through a resin bath 90 and pulled through an outer die 92 by a pultrusion machine. The inner 86 and outer 92 molds are preferably heated to set the resin into its final form. The pultrusion process/injection system impregnates the resin into the tensioned woven sock 84. The tensioned resin impregnated sock hardens to create a pultruded member 22. The pre-tensioning of the sock 84 increases the stiffness of the member 22. The pultruded member 22 is subsequently cut into individual utility pole pieces that are then assembled to create utility poles, and the mold plug 86 removed. To facilitate the removal of the plug, the plug is preferably coated with a mold release, and may be tapered 88 from one end to the other. While a plug tapered for ease of removal will result in a pole having tapered inner surfaces, this effect can be used to advantage to fabricate intentionally tapered poles having a varying wall thickness and strength along its length, as in normal use, a utility pole experiences the largest forces and bending moments adjacent the bottom thereof. In particular, a sock or mat may be knitted or woven with a varying amount of material along its length, and varying amounts of rovings may be fed into the impregnation station during the pultrusion process, preferably while adjusting the total tensile load on the fiberous materials accordingly. Pulling of the pole in the pultrusion process may be from thicker end of the pultruded pole (the smaller end of the plug) or from the thinner end of the pultruded pole (the larger end of the plug). However pulling from the thicker end of the pultruded pole is preferred so that the pulling force will be reduced as the pole cross section is reducing. Otherwise the pulling force would preferably be increasing, putting increased pulling loads on the smaller cross section pole sections already formed.

The ability to form a tapered pole cross section also tapered in the amount of mats, rovings or both, whether using the exemplary process just described or using some other process, has very substantial advantages, as it allows putting the strength and rigidity in the finished pole where and as needed without using excess material in other regions. Minimizing materials required minimizes cost and weight of the finished pole, providing a strong competitive advantage over non-tapered structures.

Note that the word taper is used in the general sense herein, and is not limited to linear tapers. For instance, the plug may have a varying taper along its length to form a pole which, on installation, will have its greatest thickness and structure at the bottom of the pole where bending moments are the greatest, with the thickness decreasing to perhaps approximately the middle of the pole, and then decreasing in thickness at a significantly lower rate to the top of the pole. Actually the top of the pole might be made thicker again for through bolting the cross bars by using a two piece plug temporarily joined at the point of minimum cross section for the pultrusion process, with each piece of the plug being removed from a respective end of the pultruded pole. Also, a collapsible plug could be used if desired.

Alternatively, instead of an inner mold plug that travels with the pole during the pultrusion process, the inner mold plug may be a shorter mold plug supported from behind, and the sock formed from a roll of fabric or mat by curling the same around the plug forward of its support, with or without stitching together the seam so formed prior to entry into the resin impregnation station.

In the various pultrusion processes that may be used to fabricate the poles of the present invention, symmetry in the amount and type of materials used and in the tension applied to the solid materials during the process results in the fabrication of straight poles. However, curved poles may be desired for some applications, such as, by way of example, for wind power generating systems, wherein a large wind powered generator is supported on a tower. Such towers not only need to support the weight of the generator, propeller, etc., but also because the propeller is not freely turning, must resist the high lateral wind forces on the propeller as the generator extracts energy from the wind. Such towers can be fabricated using, by way of further example, three curved poles in accordance with the present invention, the three being joined at the top and curving downward and outward, with or without spacers there between at various elevations, to provide a substantial footprint for the tower to resist the wind forces on the generating unit on the top of the tower. The curved beams may be fabricated by using unsymmetrical tension in the rovings or mats or both during the pultrusion process, by using different material having different coefficients of expansion for the rovings or mats or both, such as graphite and fiberglass, or by using both techniques. In the case of a mat that is initially provided on a roll and is curved into a circular shape around a fixed mold plug, with or without stitching the adjacent edges together, unsymmetrical tension may be applied thereafter before the mat enters the impregnation station. The different tension results in unsymmetrical pre-stressing of the pole, causing the pole to be curved when in the free state. Similarly, unsymmetrical use of materials having different coefficients of expansion will cause the beam to curve as the beam cools from the high curing temperature of the resin to ambient temperature. By way of example, a mat may be two, half-width mats of different material sewn together edgewise. The could also be a single woven mat with the longitudinal fibers on the two sides of the centerline of the mat being of different materials. A curved pole could also be fabricated to have a tapered thickness using, by way of example, any of the processes previously described.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A pole comprising:
   an elongate composite beam having an inner periphery and an outer periphery, the outer periphery having N substantially flat sides defining a polygonal shape with a corner between each pair of adjacent sides, the inner periphery also having N substantially flat sides, each being substantially parallel to the N substantially flat sides defining the outer periphery, adjacent pairs of the N substantially flat sides of the inner periphery being joined adjacent the corners of the beam by circular arc segments substantially tangent to the adjacent pairs of flat sides, the corners of the beam including rovings of high strength filaments pre-stressed in tension, the beam further including matting or fabric of high strength filaments extending around the beam, the high strength filaments of the rovings and matting or fabric being impregnated in resin.

2. The pole of claim 1 wherein opposite sides of the pole are parallel to each other.

3. The pole of claim 1 wherein the rovings of high strength filaments pre-stressed in tension in the corners of the beam are pre-stressed unevenly to contribute to a curve in the pole.

4. The pole of claim 1 wherein the matting or fabric of high strength filaments is pre-stressed unevenly to contribute to a curve in the pole.

5. The pole of claim 1 wherein both the rovings and matting or fabric of high strength filaments are pre-stressed unevenly to contribute to a curve in the pole.

6. The pole of claim 1 wherein the matting or fabric is in the form of a sock, the sock being pre-stressed unevenly to contribute to a curve in the pole.

7. The pole of claim 1 wherein the rovings of high strength filaments pre-stressed in tension in the corners of the beam comprise an unsymmetrical distribution of materials of different coefficients of expansion to contribute to a curve in the pole.

8. The pole of claim 1 wherein the materials of different coefficients of expansion comprise graphite and fiberglass.

9. The pole of claim 1 wherein the matting or fabric of high strength filaments comprise an unsymmetrical distribution of materials of different coefficients of expansion to contribute to a curve in the pole.

10. The pole of claim 9 wherein the materials of different coefficients of expansion comprise graphite and fiberglass.

11. The pole of claim 1 wherein the rovings and matting or fabric of high strength filaments comprise an unsymmetrical distribution of rovings and mats or fabric of filaments of different coefficients of expansion to contribute to a curve in the pole.

12. The pole of claim 11 wherein the materials of different coefficients of expansion comprise graphite and fiberglass.

13. The pole of claim 1 wherein the thickness of the flat sides varies along at least part of the length of the pole.

14. The pole of claim 13 wherein the dimensions of the inner periphery of the pole vary to vary the thickness of the flat sides along at least part of the length of the pole.

15. The pole of claim 13 wherein the pole comprises high strength filaments impregnated with resin, the amount of filament and resin varying along the length of the pole.

16. The pole of claim 1 further comprising a first layer of rovings adjacent to the rovings of high strength filaments pre-stressed in tension.

17. The pole of claim 16 further comprising a second layer of rovings adjacent to the first layer of rovings.

18. The pole of claim 17 wherein the matting of fabric of high strength filaments comprise:
    a first layer of matting or fabric disposed between the rovings of high strength filaments pre-stressed in tension and the first layer of rovings; and
    a second layer of matting of fabric disposed between the first layer of rovings and the second layer of rovings.

19. The pole of claim 7 wherein the rovings of high strength filaments pre-stressed in tension are triangular shaped bundle of rovings.

20. A tiered pole assembly comprising:
    first and second pole sections, each comprising an elongate composite beam having an inner periphery and an outer periphery, the outer periphery having N substantially flat sides defining a polygonal shape with a corner between each pair of adjacent sides, the inner periphery also having N substantially flat sides, each being substantially parallel to the N substantially flat sides defining the outer periphery, adjacent pairs of the N substantially flat sides of the inner periphery being joined adjacent the corners of the beam by circular arc segments substantially tangent to the adjacent pairs of flat sides, the corners of the beam including rovings of high strength filaments pre-stressed in tension, the beam further including matting or fabric of high strength filaments extending around the beam, the high strength filaments of the rovings and matting or fabric being impregnated in resin, the first and second pole sections being of different size so that the second pole section fits within the second pole section; and,
    a coupling member comprising a ring with a plurality of integral downward protruding legs equal to N, the legs being notched for increased flexibility and each being bonded on their inner surface to a respective outer surface of an end of the second pole and on their outer surface to a respective inner surface of an end of the first pole.

21. The tiered pole assembly of claim 20 wherein the ring of the coupling member forms a water barrier between the first and second pole sections.

22. The tiered pole assembly of claim 20 further comprising a first layer of rovings adjacent to the rovings of high strength filaments pre-stressed in tension.

23. The tiered pole assembly of claim 22 further comprising a second layer of rovings adjacent to the first layer of rovings.

24. The tiered pole assembly of claim 23 wherein the matting of fabric of high strength filaments comprise:
    a first layer of matting or fabric disposed between the rovings of high strength filaments pre-stressed in tension and the first layer of rovings; and
    a second layer of matting of fabric disposed between the first layer of rovings and the second layer of rovings.

25. The tiered pole assembly of claim 24 wherein the rovings of high strength filaments pre-stressed in tension are triangular shaped bundle of rovings.

26. A coupling member for coupling hollow composite poles of different sizes comprising a ring with a plurality of integral downward protruding legs equal to N, the legs being notched for increased flexibility for bonding on their inner surface to a respective outer surface of an end of a pole and on their outer surface to a respective inner surface of an end of another pole.

27. A method of forming a beam comprising pultruding matting or fabric and rovings of high tensile strength material impregnated with resin through a heated die to form a hollow, the matting or fabric and rovings are made unsymmetrical to cause the resulting pole to curve.

28. The method of claim 27 wherein the pole is made unsymmetrical at least in part by providing unsymmetrical tension in the matting or fabric during pultruding.

29. The method of claim 27 wherein the pole is made unsymmetrical at least in part by providing an unsymmetrical tension in the rovings during pultruding.

30. The method of claim 27 wherein the pole is made unsymmetrical at least in part by providing an unsymmetrical distribution of materials of different coefficients of expansion in the matting or fabric.

31. The method of claim 30 wherein the materials of different coefficients of expansion comprise graphite and fiberglass.

32. The method of claim 27 wherein the pole is made unsymmetrical at least in part by providing an unsymmetrical distribution of materials of different coefficients of expansion in the rovings.

33. The method of claim 32 wherein the materials of different coefficients of expansion comprise graphite and fiberglass.

34. The method of claim 27 wherein the pole is made unsymmetrical at least in part by providing unsymmetrical distribution of materials of different coefficients of expansion in the rovings and matting or fabric.

35. The method of claim 34 wherein the materials of different coefficients of expansion comprise graphite and fiberglass.

36. The method of claim 27 wherein pultruding matting or fabric and rovings of high tensile strength material further comprises:
    providing a first layer of rovings adjacent to a triangular shaped bundle of rovings; and
    providing a second layer of longitudinal rovings adjacent to the first layer of longitudinal rovings.

37. The method of claim 36 wherein pultruding matting or fabric and rovings of high strength material further comprises:
   disposing of a first layer of matting or fabric between the first layer of rovings and the triangular shaped bundle of rovings; and
   disposing a second layer of matting or fabric between the first layer of rovings and the second layer of matting or fabric.

38. A method of forming a nonlinear tapered composite beam comprising pultruding matting or fabric and rovings of high tensile strength material saturated with resin through a heated die and over a tapered plug to form a hollow pole having a varying wall thickness along its length from the resulting tapered inner periphery, and removing the plug.

39. The method of claim 38 wherein the amount of rovings used is varied with the varying wall thickness.

40. The method of claim 38 wherein the amount of matting or fabric used is varied with the varying wall thickness.

41. The method of claim 38 wherein the amount of rovings and matting or fabric used is varied with the varying wall thickness.

42. A curved pole manufactured by pultruding rovings and matting or fabric of high strength filaments impregnated with a resin in an asymmetrical process.

43. The curved pole of claim 42 wherein the asymmetrical process comprises tensioning the rovings asymmetrically during the pultrusion process.

44. The curved pole of claim 43 wherein the pole has an inner periphery and an outer periphery, the outer periphery having N substantially flat sides defining a polygonal shape with a corner between each pair of adjacent sides, the inner periphery also has N substantially flat sides, each being substantially parallel to the N substantially flat sides defining the outer periphery, adjacent pairs of the N substantially flat sides of the inner periphery being joined adjacent the corners of the pole by circular arc segments substantially tangent to the adjacent pairs of flat sides, the corners of the pole including rovings of high strength filaments asymmetrically pre-stressed in tension.

45. The curved pole of claim 43 wherein the pole is an elongate unitary pole having an inner periphery and an outer periphery, the pole including matting or fabric of high strength filaments extending around the pole, the pole further including rovings of high strength filaments distributed around the cross section of the pole adjacent the periphery of the pole, the rovings being oriented parallel to the axis of the pole and pre-stressed in tension, the high strength filaments of the rovings and matting or fabric being impregnated in resin, the corners of the pole including rovings of high strength filaments asymmetrically pre-stressed in tension.

46. The curved pole of claim 42 wherein pultruding rovings further comprises:
   pultruding a triangular shaped bundle of rovings; and
   pultruding a first layer of rovings adjacent to the triangular shaped bundle of rovings.

47. The curved pole of claim 46 wherein pultruding rovings further comprises:
   pultruding a second layer of rovings adjacent to the first layer of rovings.

48. The curved pole of claim 47 wherein pultruding matting or fabric of high strength filaments further comprises:
   pultruding a first layer of matting or fabric between the triangular shaped bundle of rovings; and
   pultruding a second layer of matting or fabric between the first layer of matting or fabric and the second layer of matting or fabric.

49. A curved pole manufactured by pultruding rovings and matting or fabric of high strength filaments having an asymmetrical distribution of different materials.

50. The curved pole of claim 49 wherein the different materials have different coefficients of expansion.

51. The curved pole of claim 50 wherein the different materials comprise graphite and fiberglass.

52. The curved pole of claim 49 wherein the pole has an inner periphery and an outer periphery, the outer periphery having N substantially flat sides defining a polygonal shape with a corner between each pair of adjacent sides, the inner periphery also has N substantially flat sides, each being substantially parallel to the N substantially flat sides defining the outer periphery, adjacent pairs of the N substantially flat sides of the inner periphery being joined adjacent the corners of the pole by circular arc segments substantially tangent to the adjacent pairs of flat sides, the corners of the pole including rovings of high strength filaments asymmetrically pre-stressed in tension.

53. The curved pole of claim 52 wherein the different materials have different coefficients of expansion.

54. The curved pole of claim 53 wherein the different materials comprise graphite and fiberglass.

55. A pole comprising:
   an elongate unitary beam having an inner periphery and an outer periphery, the beam including matting or fabric of high strength filaments extending around the beam, the beam further including rovings of high strength filaments distributed around the cross section of the beam adjacent the periphery of the beam, the rovings being oriented parallel to the axis of the beam and pre-stressed unevenly in tension to curve the pole, the high strength filaments of the rovings and matting or fabric being impregnated in resin.

56. The pole of claim 55 wherein the rovings are equally spaced around the cross section of the beam in N bundles.

57. The pole of claim 55 wherein each wall of the beam defined by the matting or fabric impregnated in resin extending between adjacent bundles of pre-stressed rovings is substantially inline with the center of the adjacent bundles.

58. The pole of claim 55 wherein the thickness of the walls of the pole varies along at least part of the length of the pole.

59. The pole of claim 58 wherein the dimensions of the inner periphery of the pole vary to vary the thickness of the walls along at least part of the length of the pole.

60. The pole of claim 55 wherein the pole has an even number of sides.

61. A pole comprising:
   an elongate unitary beam having an inner periphery and an outer periphery, the beam including matting or fabric of high strength filaments extending around the beam, the matting or fabric of high strength filaments being pre-stressed unevenly to contribute to a curve in the pole, the beam further including rovings of high strength filaments distributed around the cross section of the beam adjacent the periphery of the beam, the rovings being oriented parallel to the axis of the beam and pre-stressed in tension, the high strength filaments of the rovings and matting or fabric being impregnated in resin.

62. The pole of claim 61 wherein the rovings are equally spaced around the cross section of the beam in N bundles.

63. The pole of claim 61 wherein each wall of the beam defined by the matting or fabric impregnated in resin extending between adjacent bundles of pre-stressed rovings is substantially inline with the center of the adjacent bundles.

64. The pole of claim 61 wherein the thickness of the walls of the pole varies along at least part of the length of the pole.

65. A pole comprising:
an elongate unitary beam having an inner periphery and an outer periphery, the beam including matting or fabric of high strength filaments extending around the beam, the beam further including rovings of high strength filaments distributed around the cross section of the beam adjacent the periphery of the beam, the rovings being oriented parallel to the axis of the beam and pre-stressed in tension, the high strength filaments of the rovings and matting or fabric being impregnated in resin, both the rovings and matting or fabric of high strength filaments being pre-stressed unevenly to contribute to a curve in the pole.

66. The pole of claim 65 wherein the rovings are equally spaced around the cross section of the beam in N bundles.

67. The pole of claim 65 wherein each wall of the beam defined by the matting or fabric impregnated in resin extending between adjacent bundles of pre-stressed rovings is substantially inline with the center of the adjacent bundles.

68. The pole of claim 65 wherein the thickness of the walls of the pole varies along at least part of the length of the pole.

69. A pole comprising:
an elongate unitary beam having an inner periphery and an outer periphery, the beam including matting or fabric of high strength filaments extending around the beam, the matting or fabric being in the form of a sock, the sock being pre-stressed unevenly to contribute to a curve in the pole, the beam further including rovings of high strength filaments distributed around the cross section of the beam adjacent the periphery of the beam, the rovings being oriented parallel to the axis of the beam and pre-stressed in tension, the high strength filaments of the rovings and matting or fabric being impregnated in resin.

70. The pole of claim 69 wherein the rovings are equally spaced around the cross section of the beam in N bundles.

71. The pole of claim 69 wherein each wall of the beam defined by the matting or fabric impregnated in resin extending between adjacent bundles of pre-stressed rovings is substantially inline with the center of the adjacent bundles.

72. The pole of claim 69 wherein the thickness of the walls of the pole varies along at least part of the length of the pole.

73. A pole comprising:
an elongate unitary beam having an inner periphery and an outer periphery, the beam including matting or fabric of high strength filaments extending around the beam, the beam further including rovings of high strength filaments distributed around the cross section of the beam adjacent the periphery of the beam, the rovings being oriented parallel to the axis of the beam and pre-stressed in tension, the rovings having an asymmetrical distribution of materials of different coefficients of expansion to contribute to a curve in the pole, the high strength filaments of the rovings and matting or fabric being impregnated in resin.

74. The pole of claim 73 wherein the materials of different coefficients of expansion comprise graphite and fiberglass.

75. The pole of claim 73 wherein the rovings are equally spaced around the cross section of the beam in N bundles.

76. The pole of claim 73 wherein each wall of the beam defined by the matting or fabric impregnated in resin extending between adjacent bundles of pre-stressed rovings is substantially inline with the center of the adjacent bundles.

77. The pole of claim 73 wherein the thickness of the walls of the pole varies along at least part of the length of the pole.

78. A pole comprising:
an elongate unitary beam having an inner periphery and an outer periphery, the beam including matting or fabric of high strength filaments extending around the beam, the matting or fabric of high strength have an asymmetrical distribution of materials of different coefficients of expansion to contribute to a curve in the pole, the beam further including rovings of high strength filaments distributed around the cross section of the beam adjacent the periphery of the beam, the rovings being oriented parallel to the axis of the beam and pre-stressed in tension, the high strength filaments of the rovings and matting or fabric being impregnated in resin.

79. The pole of claim 78 wherein the materials of different coefficients of expansion comprise graphite and fiberglass.

80. The pole of claim 78 wherein the rovings are equally spaced around the cross section of the beam in N bundles.

81. The pole of claim 78 wherein each wall of the beam defined by the matting or fabric impregnated in resin extending between adjacent bundles of pre-stressed rovings is substantially inline with the center of the adjacent bundles.

82. The pole of claim 78 wherein the thickness of the walls of the pole varies along at least part of the length of the pole.

83. A tiered pole assembly comprising:
an elongate unitary pole having an inner periphery and an outer periphery, the pole including matting or fabric of high strength filaments extending around the pole, the pole further including rovings of high strength filaments distributed around the cross section of the pole adjacent the periphery of the pole, the rovings being oriented parallel to the axis of the pole and pre-stressed in tension, the high strength filaments of the rovings and matting or fabric being impregnated in resin; and,
a coupling member comprising a ring with a plurality of integral downward protruding legs equal to N, the legs being notched for increased flexibility and each being bonded on their inner surface to a respective outer surface of an end of the second pole and on their outer surface to a respective inner surface of an end of the first pole.

84. The tiered pole assembly of claim 83 wherein the ring of the coupling member forms a water barrier between the first and second pole sections.

85. The tiered pole assembly of claim 83 wherein the rovings of high strength filaments comprises:
a triangular shaped bundle of rovings disposed of corners of the elongated unitary pole; and
a first layer of rovings adjacent to the triangular shaped bundle of rovings.

86. The tiered pole assembly of claim 85 wherein the matting or fabric of high strength filaments comprises:
a first layer of matting or fabric disposed between the triangular shaped bundle of rovings; and
a second layer of matting or fabric disposed between the first layer of matting or fabric and the second layer of matting or fabric.

87. A pole comprising:
an elongate composite beam having an inner periphery and an outer periphery, the outer periphery having N substantially flat sides defining a polygonal shape with a corner between each pair of adjacent sides, the inner periphery also having N substantially flat sides, each being substantially parallel to the N substantially flat sides defining the outer periphery, adjacent pairs of the N substantially flat sides of the inner periphery being joined adjacent the comers of the beam by circular arc segments substantially tangent to the adjacent pairs of flat sides;

wherein the beam further comprises rovings of high strength filaments at the comer of the beam, a first layer of rovings adjacent to the rovings of high strength filaments pre-stressed in tension matting or fabric of high strength filaments extending around the beam, the high strength filaments of the rovings and matting or fabric being impregnated in resin.

88. The pole of claim 87 further comprising:

a second layer of rovings adjacent to the first layer of rovings.

89. The pole of claim 88 wherein the matting or fabric of high strength filaments comprises:

a first layer of matting or fabric between the rovings and first layer of rovings; and a second layer of matting or fabric between the first layer of rovings and second layer of rovings.

* * * * *